United States Patent Office 3,740,356
Patented June 19, 1973

3,740,356
CELLULAR POLYMERIC MATERIAL, A PROCESS FOR ITS PREPARATION AND A COATING MATERIAL WHICH CONTAINS SUCH POLYMERIC MATERIAL
Pablo E. Munoa and Eduardo M. Simonin, Buenos Aires, Argentina, assignors to Sociedad Anonima Alba Fabrica de Pinturas, Esmaltes y Barnices, Buenos Aires, Argentina
No Drawing. Filed July 30, 1970, Ser. No. 59,709
Claims priority, application Argentina, Aug. 29, 1969, 223,800
Int. Cl. C08f 47/08; B01j 13/02
U.S. Cl. 260—2.5 B                                       8 Claims

ABSTRACT OF THE DISCLOSURE

Polymeric material in the form of small corpuscles or particles which contain therein one or a plurality of cavities. The polymeric material is useful as a component for coating compositions, plastics, films or fibers. Processes for the preparation of the polymeric material as well as the compositions incorporating same.

FIELD OF THE INVENTION

This invention relates to a corpuscular, polymeric material of cellular structure and to a process for its preparation. More particularly, this invention relates to a cellular polymeric material consisting of particles ranging in size between 500 microns as a maximum to 0.02 micron as a minimum; these particles contain at least one cavity or what is preferred, several cavities of a mean diameter of less than 200 microns. This invention further relates to a process for the preparation of these cellular polymeric particles; and further relates to a coating material which contains the cellular polymeric particles referred to above. This coating material is based on cellular polymeric particles as described above and a binder which is a polymer in the form of a suspension (emulsion, latex) or a solution. The advantages to be obtained through the use of this coating material will become apparent from the following description and explanations.

BACKGROUND OF THE INVENTION

A number of widely used natural and artificial materials present an alveolar structure, e.g. natural sponges and plastic foams. Their usefulness depends on the nature of the solid component and on the shape, size, and distribution of the cavities or cells. If several materials of this type are prepared, in which the total volume of cavities is the same but which differ in the size of the individual cells, it will be observed that as this size is decreased they exhibit to an increasing extent an optical phenomenon resulting from the multiple light scattering: the capacity of hiding the contrasts of color or lightness of objects observed through a certain thickness of the material. This effect, technically known as "hiding power," is usually obtained in certain industrial products, e.g. paints, plastics, artificial fibers or glass, through the use of finely divided substances, called pigments, that experience has shown to be suitable for obtaining the desired properties.

SUMMARY OF THE INVENTION

This invention relates to a polymeric material in the form of small particles which exhibit a cellular structure. The sizes of the particles and of the cells make this material suitable for obtaining hiding power or contributing to it and whiteness in such products as paints, plastic materials, films, and artificial fibers. This material also contributes to a decrease in the density and improves the thermal and acoustical insulating properties of those products. Each individual particle may be described as a spherical or irregular, approximately isometric body including one or several cavities or cells. The volume of each cell and the size of the particle is regulated according to the intended final use by suitably altering the process variables. If the product is used in order to obtain hiding power in a flat paint the particles should be made of a relatively large size; if it will be used in a glossy coating, the particles should be of a very small size. The optical effect that results from the physical structure described above is due to the presence of multiple interfaces between substances of different refractive indices, such as water-polymer or air-polymer, and their random orientation. When the particles are submitted to an incident beam of white light, the latter is repeatedly scattered in all directions, producing diffused light; this phenomenon is similar to the one that takes place with white pigments: when all wave lengths are equally scattered the resulting diffused light produces the visual sensation of white. This is not, of course, a complete description of the physical phenomenon involved but it explains clearly how the result is obtained when the process is effected as described, which by its characteristics is here referred to as a "double emulsion" process. In this process a liquid, which is immiscible with a polymer solution, is emulsified in this solution; the emulsion is then emulsified in a liquid which is immiscible with the polymer solution. The "double emulsion" thus obtained is formed by a continuous phase in which immiscible droplets of a polymer solution are dispersed; these droplets contain smaller droplets of an immiscible liquid. For example, water may be conveniently used as the immiscible liquid if the polymer solution is not miscible with water. In this case, the process comprises the preparation of a polymer solution in an appropriate volatile solvent whose boiling point is lower than 100° C. While this solution is stirred water is slowly added to it in the presence of suitable surface-active agents; a "water in oil" emulsion is thus obtained. By further slow addition of water a partial inversion of the first emulsion results and a system is thus obtained which consists of water as a continuous phase and containing, as a dispersed phase, small drops of the polymer solution which in turn contain still smaller water droplets. This physical structure may be checked through microscopical observation. The process is completed by evaporating the volatile solvent and part of the water at reduced pressure with stirring. If desired, the particles may be separated from the water and dried.

By adequately combining particle size and microcellular structure this product is made advantageously usable in paints, plastics, films or fibers. When produced in the form of a dry powder it can be added to different compositions, such as emulsion or solution paints, through the conventional means used in the paint industry by which powders and liquids are incorporated and homogenized. An additional and very important advantage is that the aqueous dispersion of the cellular polymeric particles can be incorporated into water-based paints simply by mixing; the operations of drying and dispersing are thus eliminated. The use of this material results in a decreased density in the final product, which is generally of an economical advantage. In addition to the particles of the invention, the coating material may contain white pigments, extenders, colored pigments, wetting and thickening agents, preservatives, anti-foaming agents and other additives which may be added in order to obtain the desired storage keeping and application properties and the desired performance and service.

The following examples will serve to further illustrate the invention. However, it should be understood that the invention is not intended to be limited thereby.

Example 1

In a five-liter, three-necked flask equipped with an electric heating mantle, stirrer, thermometer, water trap and condenser, 1015 grams of freshly distilled methyl methacrylate were charged; 10.2 grams of inhibitor-free methacrylic acid, 1320 grams benzene and 4.2 grams benzoyl peroxide were added and the mixture was stirred and heated at reflux temperature for three hours.

Then 0.9 gram benzoyl peroxide in 25.5 grams benzene were added and heating at reflux temperature was continued for 3 further hours. Addition and heating were repeated for a second and a third time. The final product was adjusted to 46% solids and the Gardner viscosity at 25° C. was greater than Z 6 (A.S.T.M. Book of Standards, part 21, page 321 (1968)—Method D 1545–63).

350 grams of this polymer solution were charged into a cylindrical metal container with a diameter of about 11 centimeters equipped with a high-speed, disc stirrer with a diameter of 5 centimeters of the "Cowles Hi-shear" type (made by Morehouse-Cowles, Inc., California, U.S.A.). The solution was stirred at 2,300 r.p.m. and a mixture of 21 grams triethanolamine and 1 gram of sodium alkyl aryl sulphonate 33% aqueous solution ("Quimolene de sodio," Compañia Química, Buenos Aires, Argentina) was added. After mixing for 30 seconds, the addition of water, at a rate of 30 milliliters per second, was started and continued until 500 milliliters water had been added. By microscopical observation the resulting emulsion was seen to consist of small drops of resin solution dispersed in water; within these droplets a fine dispersion of water was seen.

This emulsion was transferred to a five-liter, three necked flask placed in a water bath and provided with vacuum connection, a stirrer and thermometer. The pressure was reduced to 350 mm. Hg, stirring at about 100 r.p.m. started and heating was applied slowly to the bath for three hours, keeping the temperature under 70° C.

When this operation was finished, the material, formed by small cellular particles, was separated from the excess water by filtering with suction and the particles were dried in an oven at 90° C.

Example 2

In the apparatus used in Example 1 a polymer solution was prepared as described, except that 20.4 grams methacrylic acid were used. 289 grams of the polymer solution were charged into the dispenser of Example 1 and stirred at 2,300 r.p.m.

A mixture of 103.8 grams sodium alkyl aryl polyglycol ether sulfonate (Triton X 200, Röhm and Haas, Philadelphia, Pa., U.S.A.) and 29.4 grams water was added and after 30 seconds the addition of 461.8 grams water was started and effected as described in Example 1. The process was continued and the product finished as in Example 1.

Example 3

900 grams benzene were charged into a five-liter, three-necked glass flask equipped with a stirrer, water trap and condenser. The benzene was heated to reflux temperature and the addition started, from a dropping funnel, of a mixture of 1470 grams of recently distilled styrene, 100 grams of inhibitor-free methacrylic acid and 4.5 grams benzoyl peroxide. The addition was completed in 90 minutes and the heating was continued for three hours. Then a solution (A) of 1.5 grams benzoyl peroxide in 45 ml. benzene was added, the heating continued for two more hours, another portion of solution (A) was added and the heating continued for two further hours. A polymer solution was obtained the Gardner viscosity of which at 25° C. was over Z 6 at 50% solids.

268 grams of this solution were charged into the emulsifier described in Example 1, stirring at 2,300 r.p.m. started and a homogeneous mixture of 21.2 grams triethanolamine and 1.8 grams ammonium alkyl aryl polyglycol sulfonate (Fenopon CO 436, General Aniline and Film Corp., New York, U.S.A.) added. The stirring was continued and after 30 seconds the addition of 300 grams water (I) was started, followed by a solution (II) of 2.6 grams polyvinyl alcohol (Mowiol 3098, Hoechst, Frankfurt (Main), Germany) in 229.5 grams water and then by 176.6 grams water (III). The average addition rate for I, II and III was 30 ml. per minute. The product obtained in this operation was observed to be an emulsion of polymer solution droplets which contained a fine aqueous dispersion within them. The further processing of the emulsion was carried out as described in Example 1, except for the temperatures, which were limited to 45° C. during the solvent evaporation stage and to 50° C. for the drying stage.

Example 4

The resin contained in 1 kilogram of the polymer solution obtained in Example 1 was recovered by precipitation with petroleum ether, using the conventional techniques. The polymer was redissolved and reprecipitated twice and then dried. A solution was prepared of 300 grams polymer in 450 grams methylene chloride and charged into the emulsifier of Example 1. After adding a mixture of 18 grams triethanolamine and 2 grams of a 33% aqueous solution of sodium alkyl-arylsulfonate (Quimolene de Sodio, Compañia Química, Buenos Aires, Argentina) stirring was started and allowed to proceed for 30 seconds; then, without interrupting the agitation, 300 grams water were added in a period of 10 minutes, followed by a solution of 39 grams polyvinyl alcohol (Gohsenol GL–05, Nippon Synthetic Chem., Ind. Co., Osaka, Japan) in 500 grams water, the addition rate being maintained at 30 ml. per minute.

The emulsion thus obtained was transferred to the evaporator used in the preceding examples and similarly processed. During the evaporation the temperature was maintained at 40–45° C. for the first hour and then at 60–65° C. for two hours. The suspension thus obtained was allowed to settle and most of the water decanted.

Example 5

250 grams of the dry cellular particles prepared as in Example 1 were mixed with 300 grams of a latex containing 50% polyvinyl acetate and 10% dibutyl phthalate (Mowilith DC 02, Hoechst, Frankfurt, Germany) and the consistency was adjusted to 80 Krebs units by adding water. The mixture thus obtained was applied on a wall with a brush and with a roller; when dry it formed a film showing good hiding power and colour.

Example 6

50 grams of a 50% non volatile solution of a water soluble, air-drying vehicle (Linaqua, Spencer Kellogg Division of Textron Inc., Buffalo, N.Y., U.S.A.) were mixed with 98 grams of the material obtained in Example 4 (equivalent to 50 grams of dry material), the driers recommended by the maker of the vehicle were added and the mixture was painted with a brush. The dry film showed good color and hiding power.

Example 7

50 grams of a white spirits solution at 50% solids of an air drying alkyd resin (Beckosol 1334, Rechhold Chem. Inc., White Plains, N.Y., U.S.A.) were mixed with 50 grams of the dry product obtained in Example 2. The usual driers were added and the viscosity was adjusted to 80 Krebs units with mineral spirits. The coating thus obtained was applied with a brush; after drying a film was obtained which showed good whiteness and hiding power.

Example 8

In a laboratory stirrer 270 grams of the mixture obtained in Example 5 were charged, the stirrer was started and 15 grams rutile titanium dioxide pigment (Tipaque R 789–2), Ishihara Sangyo Kaisha Ltd., Tokyo, Japan) were added, followed by 18 grams calcium carbonate (400 mesh); 0.3 gram phthalocyanine blue (F 61, Rapp y Garcia, Buenos Aires, Argentina); 15 grams of an aqueous solution which contains 0.75% of dispersing agent (Pigment Verteiler, BASF, Ludwigshafen (Rhine), Germany), 8% of a wetting agent (Lutensol AP 9), BASF) and 0.5% antifoam agent (Antifoam Emulsion RD, Midland Silicones Ltd., London, England); 2.7 grams of an aqueous solution containing 10% sodium o-phenylphenate and 15% sodium pentachlorophenate were added and the viscosity adjusted to 80 Krebs units with a 3% aqueous solution of a thickening agent (Natrosol 250 MR, Hercules Inc., Wilmington, Del., U.S.A.).

What we claim is:

1. A process for the preparation of particles of a polymeric material of a size ranging from 500 to 0.02 microns, the said particles containing at least one cell with an average diameter of less than 200 microns which comprises:
  (a) preparing a mixture of (I) a solution of a polymer in a volatile solvent and (II) an effective amount of a surface active agent;
  (b) mixing the admixture of step (a) with a liquid which is a non-solvent for the polymer solution and emulsifying the liquid as the discontinuous phase into the polymer solution;
  (c) mixing the emulsion of step (b) with a liquid which is a non-solvent for the polymer solution to emulsify the emulsion of step (b) as the discontinuous phase into the non-solvent liquid;
  (d) evaporating the solvent for the polymer and part or all of the liquid contained within the cells in the polymer particles.

2. A process according to claim 1, wherein the particles are separated from the continuous phase by filtration, decantation or centrifugation.

3. A process according to claim 1, wherein the polymer is a copolymer of methyl methacrylate and methacrylic acid, the solvent is benzene and the non-solvent liquid is water.

4. A process according to claim 1, wherein the polymer is a copolymer of methyl methacrylate and methacrylic acid, the solvent is methylene chloride and the non-solvent liquid is water.

5. A process according to claim 1, wherein the polymer is a copolymer of styrene and methacrylate acid, the solvent is benzene and the non-solvent liquid is water.

6. A process according to claim 1, wherein the polymeric material is a methacrylic polymer.

7. A process according to claim 1, wherein the polymer is a copolymer of methyl methacrylate and methacrylic acid.

8. A process according to claim 1, wherein the polymer is a copolymer of styrene and methacrylic acid.

References Cited
UNITED STATES PATENTS

| | | | |
|---|---|---|---|
| 2,885,303 | 5/1959 | Kaplan | 260—2.5 B |
| 3,371,053 | 2/1968 | Raskin | 260—2.5 B |
| 3,255,127 | 6/1966 | Von Bonin | 260—2.5 B |
| 3,117,941 | 1/1964 | Knobloch et al. | 260—29.6 PM |
| 3,585,149 | 6/1971 | Vassiliades | 260—2.5 B |

JOHN C. BLEUTGE, Primary Examiner

W. J. BRIGGS, Jr., Assistant Examiner

U.S. Cl. X.R.

252—316; 260—2.5 L, 2.5 HB, 29.6 PM, 29.6 WQ, 29.6 MH, 86.1 R, 88.1 PC